US009380746B2

(12) United States Patent
Micka et al.

(10) Patent No.: US 9,380,746 B2
(45) Date of Patent: *Jul. 5, 2016

(54) ENVIRONMENTALLY CONTROLLED STORAGE FACILITY FOR POTATOES AND OTHER CROPS

(71) Applicant: Storage Systems Northwest, Inc., Kennewick, WA (US)

(72) Inventors: Joel Micka, Kennewick, WA (US); Robert Terry, Kennewick, WA (US)

(73) Assignee: Storage Systems Northwest, Inc., Kennewick, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/630,456

(22) Filed: Feb. 24, 2015

(65) Prior Publication Data

US 2015/0164002 A1 Jun. 18, 2015

Related U.S. Application Data

(63) Continuation of application No. 13/863,304, filed on Apr. 15, 2013, now Pat. No. 8,991,123.

(60) Provisional application No. 61/852,065, filed on Mar. 15, 2013.

(51) Int. Cl.
| | |
|---|---|
| *E04B 1/70* | (2006.01) |
| *E04F 17/00* | (2006.01) |
| *E04H 7/22* | (2006.01) |
| *A01F 25/22* | (2006.01) |
| *E04H 5/08* | (2006.01) |
| *A01F 25/08* | (2006.01) |

(Continued)

(52) U.S. Cl.
CPC ............... *A01F 25/22* (2013.01); *A01F 25/08* (2013.01); *A01F 25/10* (2013.01); *A23B 7/0425* (2013.01); *A23B 7/148* (2013.01); *E04H 5/08* (2013.01)

(58) Field of Classification Search
CPC ....... A23B 7/148; A01F 25/00; A23L 3/3418; E04F 17/04; E04H 5/08; F24F 11/0001; F24F 7/08
USPC ............................................. 52/302.1–302.3
See application file for complete search history.

(56) References Cited

U.S. PATENT DOCUMENTS

| | | | |
|---|---|---|---|
| 3,113,875 A | 12/1963 | Prater et al. | |
| 3,357,201 A | 12/1967 | Toyama | |

(Continued)

FOREIGN PATENT DOCUMENTS

GB 1035316 7/1966

OTHER PUBLICATIONS

"Adjustable-Speed Drives for When the Cows Come Home", Power Transmission Design, Nov. 1978, pp. 58-62, vol. 19, No. 11, ISSN 0032-6070, COPYRGHT. Penton/IPC, Inc., Cleveland, OH.

(Continued)

*Primary Examiner* — Mark Wendell
(74) *Attorney, Agent, or Firm* — Perkins Coie LLP (57) ABSTRACT

Facilities for storing large quantities of potatoes, other tubers, vegetables, produce, and/or other crops are disclosed herein. In one embodiment, a facility configured in accordance with the present technology circulates air from a pile of potatoes into one or more ceiling cavities above the potatoes to warm ceiling panels. Aspects of this embodiment can reduce undesirable water formation on the potatoes.

26 Claims, 5 Drawing Sheets

(51) Int. Cl.
*A01F 25/10* (2006.01)
*A23B 7/04* (2006.01)
*A23B 7/148* (2006.01)

(56) References Cited

U.S. PATENT DOCUMENTS

| | | | |
|---|---|---|---|
| 3,788,066 | A | 1/1974 | Nebgen |
| 3,884,161 | A | 5/1975 | Ankersen |
| 3,884,163 | A | 5/1975 | Ankersen |
| 3,913,661 | A | 10/1975 | Burg et al. |
| 3,949,733 | A | 4/1976 | Miller et al. |
| 4,078,480 | A | 3/1978 | Luck |
| 4,113,175 | A | 9/1978 | Sutton, Jr. |
| 4,241,871 | A | 12/1980 | Newell, III et al. |
| 4,479,079 | A | 10/1984 | Hanner |
| 4,570,532 | A | 2/1986 | Labelle |
| 4,637,296 | A | 1/1987 | Hirosaki et al. |
| 4,651,072 | A | 3/1987 | Takata |
| 4,735,134 | A | 4/1988 | Brouwer |
| 4,823,679 | A | 4/1989 | Robbins |
| 4,986,469 | A | 1/1991 | Sutton, Jr. |
| 5,376,045 | A | 12/1994 | Kiser |
| 5,460,006 | A | 10/1995 | Torimitsu |
| 5,946,922 | A | 9/1999 | Viard et al. |
| 5,969,606 | A | 10/1999 | Reber et al. |
| 6,723,364 | B1 | 4/2004 | Bompeix et al. |
| 6,892,591 | B2 | 5/2005 | Grossman et al. |
| 2005/0138943 | A1 | 6/2005 | Alahyari et al. |
| 2010/0179703 | A1 | 7/2010 | Singh et al. |
| 2011/0082591 | A1 | 4/2011 | Micka et al. |
| 2012/0012092 | A1 | 1/2012 | Micka et al. |
| 2012/0102986 | A1 | 5/2012 | Micka et al. |

OTHER PUBLICATIONS

"Potato Fan VFDs" Cascade Energy Engineering website, accessed Apr. 11, 2003. <http://www.cascadeenergy.com/cee.sub.--tool.cfm?app=energy.sub.---potatovfd.sub.--main>.
"Potato Storage Research Facility", University of Idaho Extension, page revised Mar, 31, 2003, <http://www.kimberly.uidaho.edu/potatoes.>.
"Potato Storage Research Shows Promise for Boosting Grower Profits", AgKnowledge. #169. publicly available Nov. 14, 2006, University of Idaho College of Agricultural and Life Sciences.
"Product Showcase", Potato Storage International, Jun. 2005, pp. 36-37.
"Talking Point", Potato Storage International, Mar. 2005, pp. 10-12.
"Variabie Frequency Drive", Wikipedia, accessed Jan. 11, 2008, <http//en.wikipedia.org/wiki/Variable-freguncy.sub.-drive>.
"Variable Frequency Drives", JMC Ventilation Refrigeration, LLC, .COPYRGHT, 2005 JMC.
"Ventilation Systems", Potato Storage, 1983, pp. 14-18.
ABB ACS550 adjustable speed AC drive User's Manual, Diablosport Revision Update Instructions, publicly available Nov. 14, 2006.
Allen, John P. C., el al,, "A New Cost Effective Variable Frequency Drive for Centrifugal Loads", Conference Record Industry Applications Society IEEE-IAS-1983, Eighteenth Annua Meeting of the IEEE Industry Applications Society, Oct. 3-7 1983, IEEE Catalog No. 83 CH1900-0, Library of Congress No. 80-640527.
Allen, Rich, "Frequency Drives Work, Evaluating Their Use for Potato Storage", Spudman, Jul. 1996, pp. 39-40.
Amendment, U.S. Appl. No. 07/103,326, filed Jun. 21, 1988.
Bohl, William H. et al., "Variable Frequency Drive Fan Control for Potato Storage", The Spudvine, Nov. 2002, University of Idaho Extension, Blackfoot, ID.
Burton, W.G., "Suppression of Potato Sprouting in Buildings", publicly available Nov. 14, 2006, pp. 299-305.
Connors, Dennis P. et al., "Considerations in Applying Induction Motors with Solid State Adjustable Frequency Controllers", Oct. 3-7, 1983, IEEE Paper No. PCI-82-2, Reliance Electric Company, Cleveland, OH.
Cornercroft Typhoon Storage Systems, sales pamphlet, publicly available Nov. 14, 2006.
Cuffe, Stafford S. et al., "A Variable Frequency AC Blower Drive Installation for Efficient and Accurate Control of Glass Tempering", IEEE Transactions on Industry Applications, pp. 1047-1052, Jul.-Aug. 1985, vol. IA-21, No. 4.
DeEll, Jennifer, "Research Updates from the 9th International Controlled Admosphere Research Conference", Aug. 15, 2005, Ontario Ministry of Agriculture Food and Rural Affairs, accessed Sep. 25, 2008 <http://www.omafra.gov.on.ca/english/crops/hort/news/orchnews/2005/on.-sub.-0805a9.htm>.
Energy-Efficient Electric Motors: Their Control and Application Symposium Proceedings, Feb. 23, 1983, Bonneville Power Administration, Portland, OR.
Farm Energy Centre, "Controlling Condensation in Potato Stores", Jan. 1999, retrieved from the internet URL: http://www.fecservices.co.uk/DynamicContent/Documents/tech%20pubs/TN69%20-Controlling%20condensation20in%20potato%20stores.pdf.
Forbush, T.D. et al,, "Sensing, Monitoring and Controlling Potato Storage Environments—A Process Report", For presentation at the 1987 Summer Meeting of the American Society of Agricultural Engineers, Baltimore Convention Center, Baltimore. MD, Jun. 28-Jul. 1, 1987.
Graves, Bruce, "The Selection and Application of NEMA Frame Motors for Use with Adjustable Frequency Drives", Conference Record of 1984 Annual Pulp and Paper Industry Technical Conference, Jun. 19-22, 1984, ISSN 0190-2172, COPYRGHT. 1984 by the Institute of Electrical and Electronics Engineers, Inc.
Hanson, B. et al., "Performance of Electric Irrigation Pumping Plants Using Variable Frequency Drives", Journal of Irrigation and Drainage Engineering, May-Jun. 1996, pp. 179-182, vol. 122, No. 3, American Society of Civil Engineers Water Resources Engineering Division.
Hanson, B. et al., "Variable-Frequency Drives for Electric Irrigation Pumping Plants Save Energy", California Agriculture Magazine, Jan.-Feb. 1996, pp. 36-39, vol. 50, No. 1, University of California Oakland, CA.
Helmick, C. G., "Applying the Adjustable-Frequency Drive". EC&M, Sep. 1987, pp. 59-63.
Helmke, Dennis R., "A-C Adjustable Frequency Motor Control for Process Pumping Systems". Instrumentation in Food, Water, and Wastewater Industries: Instrumentation for People, May 1980, pp. 39-43, programmed by ISA's Industries & Sciences Department's Divisions-Food Industry, Water and Wastewater Industries, COPYRGHT. ISA 1980, ISBN: 87664-472-8.
International Search Report, International Application No. PCT/US94/11419, issued Dec. 5, 1994.
Johnson, G.A., "A Retrofit Accomplishment: From Constant Air to Variable, Alternative Airflow Control Techniques and Variable Speed Drive Help Convert Single-Zone Constant Volume to Single-Zone Variable Air Volume System", Ashrae Journal, Jan. 1985, pp. 106-114, vol. 27, No. 1, ISSN-0001-2491, .COPYRGHT. 1985 by the American Society of Heating, Refrigerating and Air Conditioning Engineers, Atlanta, GA.
Koski, Steve et al., Potato Fan VFDs Phase 2 Report, Oct. 2003, prepared for Northwest Energy Efficiency Alliance, Portland, OR.
Koski, Steve, "VFD Application in Onion Storages", Onion Storage VFDs, revised May 20, 2003, pp. 1-2, Cascade Energy Engineering.
Lemeronde, Corey. "VFDs Speed Production, Ease Maintenance for RMG/FELM Wire Processing Customers", Drives Mag, .COPYRGHT. 1997-2004 DrivesMag.com, accessed Aug. 2, 2004, <http://www.drivesurvey.com/index.sub.--library.cfm?feature.sub.--id=9- 6>.
McClung, Bruce L., "A Closer Look at Adjustable Frequency Alternating Current Variable Speed Drive Systems", Proceedings of the First Annual Control Engineering Conference: held as Part of the Control Engineering Conference, 1982. pp. 169-171, published by Control Engineering.
Morton, Robert D. et al., "Evaporator Fan Variable Frequency Drive Effects on Energy and Fruit Quality", 16th Annual Postharvest Conference, Yakima, WA, Mar. 14-15, 2000, Yakima, WA, Washington State University Tree Fruit Research and Extension Center Postharvest Information Network, Wenatchee, WA.

(56) References Cited

OTHER PUBLICATIONS

Morton, Robert D. et al., "Evaporator Fan VFD Effects on Energy and Fruit Quality", publicly available Nov. 14, 2006, Cascade Energy Engineering.

Oberg, Nathan A., et al., "Impact of Ventilation System Operation on Stored Potato Quality, Shrinkage and Energy Use Efficiency", Presented at the Idaho Potato Conference on Jan. 22, 2003.

Papez. J.S., "Adjustable Flow with Adjustable Frequency", Power Transmission Design, Nov. 1978, pp. 58-62, vol. 19, No. 11, ISSN 0032-6070, .COPYRGHT. Penton/IPC, Inc., Cleveland, OH.

Potato Fan VFDs 'Can VFDs Boost My Bottom Line?', publicly available Nov. 14, 2006, published with support from the University of Idaho, Northwest Energy Efficiency Alliance, and Cascade Energy Engineering.

Potato Fan VFDs Phase 1 General Report, revised May 23, 2002, prepared by Cascade Energy Engineering, Inc., Walla Walla, WA.

Scholey, Douglas, "Induction Motors for Variable Frequency Power Supplies", IEEE Transactions on Industry Applications, Jul.-Aug. 1982, pp. 368-372, vol. IA-18, No. 4.

Selke, Gregory H., "Future Trends in Applications and Marketing of Adjustable Frequency A.C. Motor Drives", Proceedings of the Third Annual Control Engineering Conference. Held as part of the Control Engineering Conference and Exposition, Rosemont, IL, May 22-24, 1984, pp. 83-88, .COPYRGHT. 1984 by the Technical Publishing Company.

Solowjow, Alex O., "Variable Fan-Speed Control . . . A Simple and Effective Method for Reducing Plant Energy Costs", Plant Engineering, Jan. 23, 1986, pp. 55-57, vol. 40, No. 2, ISSN 0032-082X, .COPYRGHT. 1986 by Technical Publishing, Barrington, IL.

Stringer, Loren F., "Synchonous Motor Adjustable Frequency Drive Systems for Large Mechanical-Draft Fans", Proceedings of the American Power Conference, 1980, pp. 488-500, vol. 42, ISSN UU97-2126, Illinois Institute of Technology, Chicago, IL.

Talk Tips for 1,4SHIP.RTM., publicly available Nov. 14, 2006, D-I-1-4, Inc.

Tallant, Dennis, "Fanning the Cost of Energy" Telephone Engineer & Management. Feb. 15, 1981, pp. 100-104.

Techmark. Inc.'s Techlines, 2002, No. 1, Techmark, Inc., Lansing, MI.

Toshiba Transistorized PWM Inverter VF Pack-P1, 230V/460VClass 1-88kVA, Technical Data, Jan. 1987.

Urano, A.S. et al., "System Benefits and Considerations when AC Adjustable-Frequency Drives in Generating Stations", Proceedings of the American Power Conference. 1981, pp. 515-528, vol. 43, Illinois Institute of Technology, Chicago, IL.

Wilcox, Marcus H. et al., "The Evaporator Fan VFD Initiative", 14th Annual Postharvest Conference, Yakima, WA, Mar. 10-11, 1998, Washington State University Tree Fruit Research and Extension Center Postharvest Information Network, Wenatchee, WA.

Yost, John C., Jr et al., "Experiences with Adjustable Frequency Fan Drives". Proceedings of the 1983 16th Annual Frontiers of Power Conference, Oct. 10-11, 1983, pp. III-1-III-4, Oklahoma State University, Stillwater, OK.

ENVIRONMENTALLY CONTROLLED STORAGE FACILITY FOR POTATOES AND OTHER CROPS

CROSS-REFERENCE TO RELATED APPLICATION(S) INCORPORATED BY REFERENCE

The present application is a continuation of U.S. patent application Ser. No. 13/863,304, filed Apr. 15, 2013, and entitled "ENVIRONMENTALLY CONTROLLED STORAGE FACILITY FOR POTATOES AND OTHER CROPS," and claims the benefit of U.S. Provisional Patent Application No. 61/852,065, filed on Mar. 15, 2013, and entitled "ENVIRONMENTALLY CONTROLLED STORAGE FACILITY FOR POTATOES AND OTHER CROPS," both of which applications are incorporated herein in their entireties.

TECHNICAL HELD

The following disclosure relates generally to facilities, systems and associated methods for storing potatoes and other tubers, crops, produce and the like.

BACKGROUND

Potatoes and other tubers, vegetables, crops and produce are typically held in large storage facilities after harvest to maintain quality and provide a uniform supply of product to market. Modern potato storage facilities, for example, can often hold more than 20,000 tons of potatoes in piles as high as 20 feet. These piles, however, can generate considerable heat from respiration of the potatoes. One ton of stored potatoes, for example, can generate about 2 BTUs of heat per day. For this reason, conventional storage facilities typically include ventilation systems for cooling the potatoes. In addition, these facilities typically include systems for controlling the air temperature and humidity to prevent excessive dehydration, decay, and the development of high sugar concentrations in the potatoes. Table potatoes, for example, are typically stored at about 40°-45° F. and about 95% relative humidity, while potatoes for making chips or French fries are typically stored at about 45-55° F. and about 95% relative humidity. Maintaining the humidity in potato storage facilities at, e.g., above 90% can significantly reduce shrinkage and corresponding profit losses.

Conventional potato storage facilities typically include a series of vents or other openings on an exterior wall for introducing outside air into the facility. This air can be cooled and/or conditioned to increase the moisture content by moving the air through an air cooler (e.g., an evaporative cooler), a humidifier, and/or other known air conditioning devices, and then directed through a series of ventilation ducts or pipes that extend underneath the pile of potatoes. The ducts are perforated along their lengths to allow the cool, moist air to flow out and upwardly through the potatoes, cooling the potatoes and preventing excessive dehydration. The air is warmed as it flows through the potatoes, and after flowing through the pile it is typically exhausted through one or more vents in an exterior wall of the facility.

Although it can be important to maintain stored potatoes in a humid environment to reduce shrinkage, it is also desirable to keep the potatoes dry to reduce the formation of rot. One challenge associated with conventional potato storage facilities, however, is that in relatively moderate or cool climates the heated and humid air rising off the pile of potatoes can condense on ceiling panels above the potatoes. This can happen when, for example, the outside air temperature is low enough to cool the ceiling panels below the dew point of the air inside the facility. The condensation on the ceiling panels can form water droplets that fall onto the potatoes, inducing rot.

Some conventional storage facilities have attempted to address the condensation problem by heating the ceiling surfaces above the dew point with warm air from conventional gas, oil or electric heating sources. This approach, however, adds cost for operating and maintaining the heating equipment. Other storage facilities attempt to thermally insulate the ceiling panels by covering them with insulation, such as spray-on urethane insulation. Over time, however, the insulation can degrade and crack, allowing moisture to form. Moreover, the insulation may off-gas or otherwise deteriorate over time, raising concerns about product contamination. Because of the difficulties and/or cost of implementing conventional techniques for reducing water formation, some storage facility operators have simply resorted to reducing the humidity of the cooling air to avoid condensation. But reducing the humidity can lead to the undesirable result of potato dehydration and shrinkage, with a corresponding reduction in yield and lost profits.

DETAILED DESCRIPTION

The following disclosure describes various embodiments of facilities for storing large quantities of potatoes, other vegetables, and/or other crops under favorable conditions. Certain details are set forth in the following description and in FIGS. 1-9 to provide a thorough understanding of various embodiments of the present technology. In other instances, well-known structures, materials, operations and/or systems often associated with tuber (e.g., potato) storage facilities, other types of agricultural product storage facilities, building construction, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

Figure 1A:
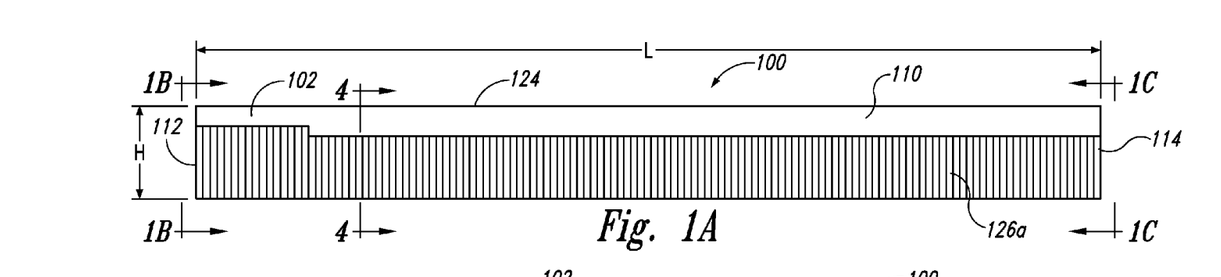
FIGS. 1A, 1B and 1C are side, front and rear elevation views, respectively, of a crop storage facility configured in accordance with an embodiment of the present technology.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

Figure 1B:
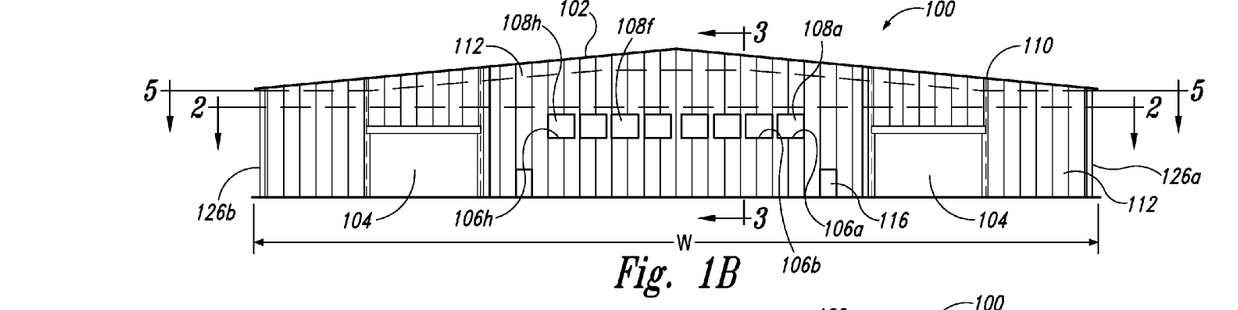
Figure 1C:
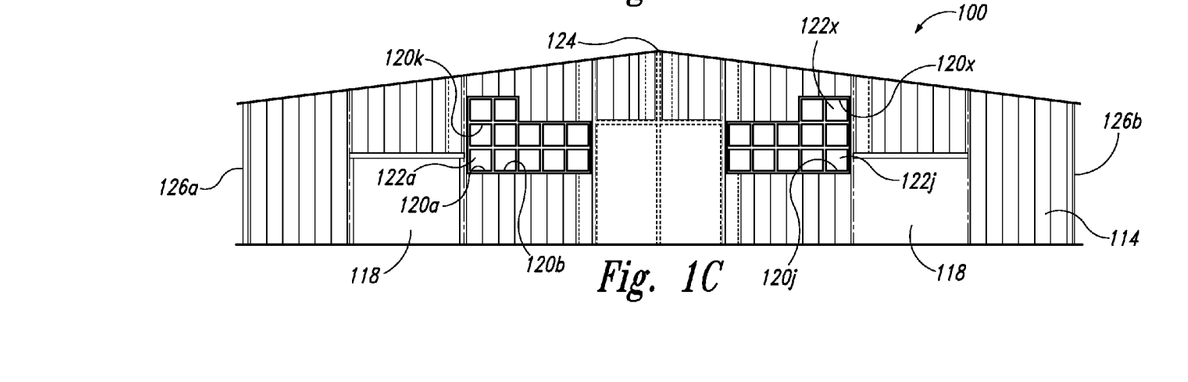

FIGS. 1A, 1B and 1C are side, front and rear elevation views, respectively of a storage facility 100 configured in accordance with an embodiment of the present technology. The storage facility 100 can be used to store potatoes and other tubers, onions, carrots, and other types of agricultural products, crops, produce etc. Although the storage facility 100 is described herein in the context of a potato storage facility, those of ordinary skill in the art will understand that the storage facility 100 and various structural and functional aspects thereof can also be used to advantageously store other tubers, vegetables, crops and/or produce. Accordingly, the technology disclosed herein is not limited to potato storage facilities unless specifically indicated as such, and in general is equally applicable to other crop storage facilities.

Referring to FIGS. 1A and 1B together, in the illustrated embodiment the storage facility 100 includes a fan house 102 positioned toward a front portion of a potato storage area 110. The fan house 102 includes a plurality of openings or vents, such as air inlets 106 (identified individually as air inlets 106a-h) formed in an exterior front wall 112. Each of the air inlets 106 can be selectively opened or closed by a corresponding door 108 (identified individually as inlet doors 108a-h). As described in greater detail below, the positions of the doors 108 relative to the corresponding openings 106 can be adjusted (e.g., individually adjusted) as desired to control the amount of outside air flowing into the storage facility 100 via the fan house 102. The fan house 102 can also include two smaller doors 116 toward opposite sides to enable persons to enter and exit the adjacent fan rooms, and each side of the storage area 110 can include a larger door 104 (e.g., a large roll up door) to allow trucks and other vehicles (not shown) to transport large quantities of potatoes to and/or from the adjacent storage bay.

Referring next to FIGS. 1A and 1C together, the storage facility 100 can include an exterior rear wall 114 having an array of openings, vents or apertures, such as air outlets 120 (identified individually as air outlets 120a-x). Each of the air outlets 120 can include a corresponding door 122 or other adjustable closure device (identified individually as doors 122a-x) that can be used to control the flow of air out of the storage facility 110. The rear wall 114 can additionally include two large doors 118 for vehicle access that are similar in structure and function to the large doors 104 (FIG. 1B) at the front of the storage area 110.

In the illustrated embodiment the storage facility 100 can be manufactured using conventional materials and techniques known in the art for constructing agricultural product storage facilities. Such materials and techniques can include, for example, welded and fastened steel framing erected on a concrete pad or foundation, and covered with relatively thin sheet metal siding and roof panels (e.g., corrugated or formed sheet metal siding and roof panels). In the illustrated embodiment, the storage facility 100 can have a length L from the front wall 112 to the rear wall 114 of from about 150 feet to about 500 feet or more, or from about 250 feet to about 450 feet, or about 390 feet. The storage facility 100 can have a height H from the ground to a roof ridge line 124 of from about 20 feet to about 50 feet, or from about 25 feet to about 40 feet, or about 37 feet. The storage facility 100 can have a width W from a right or first exterior side wall 126a to a left or second exterior side wall 126b of from about 60 feet to about 300 feet, or from about 100 feet to about 200 feet, or about 155 feet. In other embodiments, the storage facility 100 and various embodiments thereof can have other suitable shapes and sizes, and can be constructed from other suitable materials and techniques known in the art without departing from the present disclosure.

Figure 2:
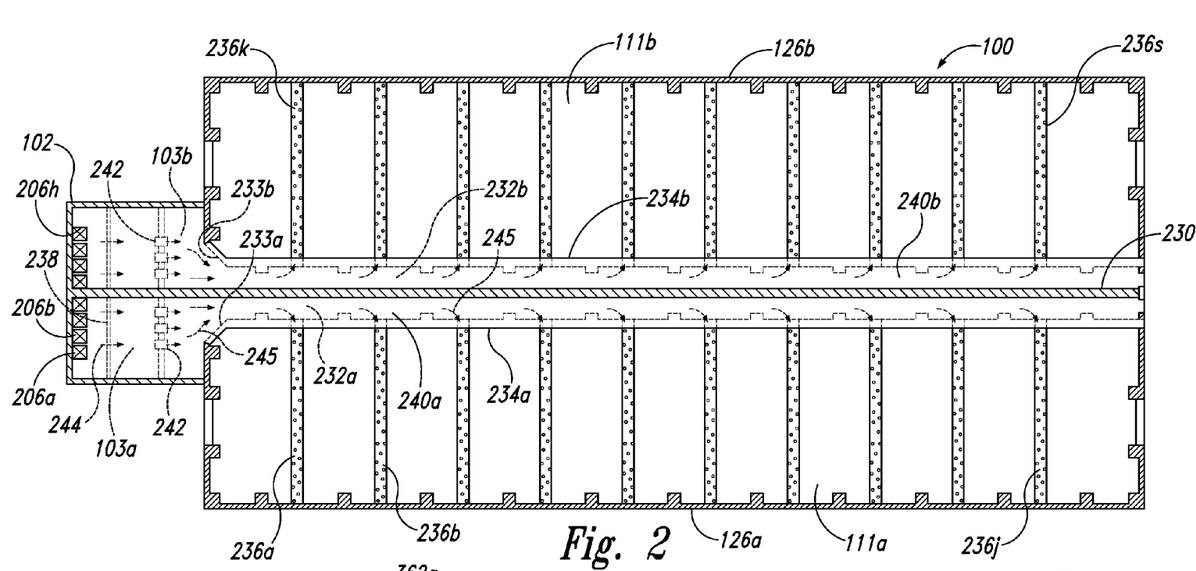
FIG. 2 is a cross-sectional top view of the storage facility of FIGS. 1A-1C taken substantially along line 2-2 in FIG. 1B.

FIG. 2 is a cross-sectional top view taken along line 2-2 in FIG. 1B just above mezzanine decks 240 (identified individually as a right or first mezzanine deck 240a and a left or second mezzanine deck 240b). In the illustrated embodiment, the storage facility 100 includes a central partition wall 230 extending upwardly from the building foundation to at least proximate the roof ridge line 124 (FIG. 1C). In this embodiment, the storage facility 100 is generally symmetrical about the central partition wall 230, with the central partition wall 230 dividing the fan house 102 into two adjacent fan rooms (identified individually as a right or first fan room 103a and a left or second fan room 103b), and the potato storage area 110 into two adjacent potato storage bays (identified individually as a right or first storage bay 111a and a left or second storage bay 111b). In operation, the first fan room 103a provides air (e.g., cool and/or humid air) to the first storage bay 111a, and the second fan room 103b provides air (e.g., cool and/or humid air) to the second storage bay 111b. For ease of reference and understanding, portions of the following description describe the various structures and functions of the storage facility 100 from the perspective of the first fan room 103a and the first potato storage bay 111a. It should be understood, however, that because of the symmetry of the illustrated embodiment the description of these structures and functions applies equally well to the second fan room 103b and the second storage bay 111b on the opposite side of the partition wall 230. In other embodiments, however, storage facilities configured in accordance with the present technology can be unsymmetrical, and/or they can have only a single potato storage bay or more than 2 storage bays. Accordingly, the technology disclosed herein is not limited to symmetrical storage facilities.

Figure 3:
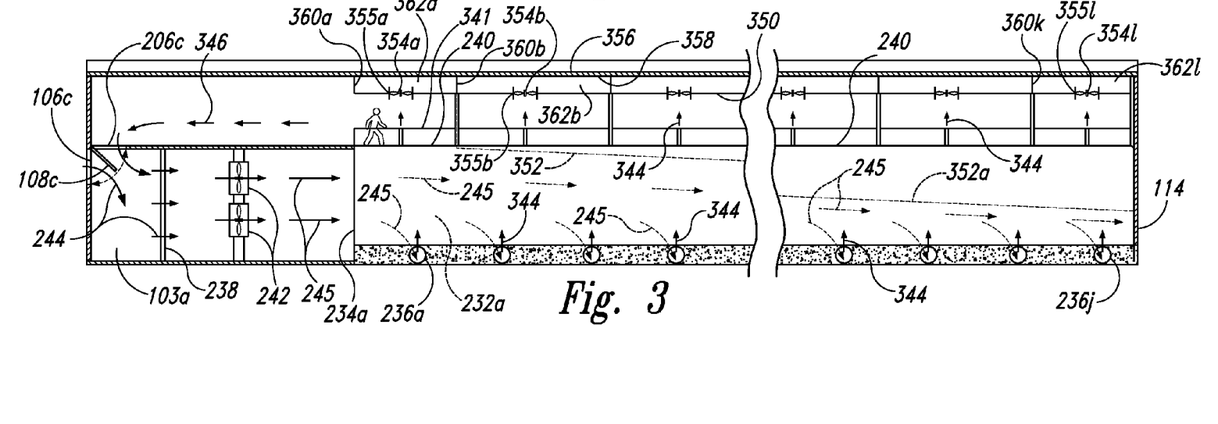
FIG. 3 is a cross-sectional, side elevation view of the storage facility of FIGS. 1A-1C taken substantially along line 3-3 in FIG. 1B.

FIG. 3 is a cross-sectional side elevation view taken along line 3-3 in FIG. 1B. Referring to FIGS. 2 and 3 together, a plurality of air movers 242 draw outside air (indicated by the arrows 244) into the fan room 103a through the inlets 106a-d and then through an air cooler 238. In the illustrated embodiment, the air movers 242 can be conventional fans known to those of ordinary skill in the art and suitable for industrial applications, such as electric motor-driven axial fans. In other embodiments, other types of air movers (e.g., centrifugal fans, crossflow fans, etc.) can be used to draw air into the fan room 103*a* via the inlets 106*a-d*. The air cooler 238 can be any type of suitable air cooler known in the art including, for example, an evaporative water cooler (e.g., a wet air cooler, "swamp cooler," etc.), a refrigerant cycle air conditioner, or other conventional air cooling/conditioning system known to those of skill in the art for use in such facilities. In some embodiments, the air cooler 238 is an evaporative water cooler that increases the moisture content in the air. As described in greater detail below, the moist air can advantageously reduce dehydration and shrinkage of tubers and other crops stored in the facility 100.

The air movers 242 move the air from each of the respective fan rooms 103 into a corresponding air plenum 232 (identified as a right or first air plenum 232*a* and a left or second air plenum 232*b*) as indicated by the arrows 245. In some embodiments, the facility 100 can also include angled side wall portions 233*a, b* (FIG. 2) extending between each of the fan rooms 103 and the respective plenum side walls 234 to provide a smooth transition for air flowing from the fan rooms 103 into the respective air plenums 232. Each of the air plenums 232 is formed by the central partition wall 230 on one side, a corresponding plenum side wall 234*a, b* on the opposite side, and a plenum ceiling or top wall 352*a, b* (FIG. 3) that extends beneath the respective mezzanine deck 240. In the illustrated embodiment, each of the mezzanine decks 240 provides a ceiling over the respective fan room 103 as well as a walkway above the air plenums 232 that extends adjacent to the respective storage bay 111. Hand/guide rails 341 can be provided along the edges of the mezzanine decks as shown in FIG. 3 for personnel safety.

In one aspect of the illustrated embodiment shown in FIG. 3, the plenum top wall 352*a* is angled or sloped downwardly as it extends away from the fan room 103*a* toward the rear facility wall 114. Without wishing to be bound by theory, reducing the cross-sectional area of the air plenum 232*a* (by, e.g., tapering the air plenum 232*a*) as it extends away from the fan house 102 in the manner shown can help maintain the flow rate and pressure of the air 244 at a relatively constant level throughout the plenum 232*a*. Maintaining the flow rate and pressure can help ensure that all the ducts 236 receive relatively equal flows of cooling air, such that the duct 236*j* positioned furthest from the fan house 102 can receive a substantially similar amount of conditioned air as the duct 236*a* positioned closest to the fan house 102. In other embodiments, however, storage facilities configured in accordance with the present technology can have air plenums with constant, or at least generally constant, cross-sectional areas and/or other shapes.

The air flowing through each of the plenums 232 flows into a series of pipes or ducts 236 (identified individually as ducts 236*a-j* in the first storage bay 111*a*, and ducts 236*i-s* in the second storage bay 111*b*) through corresponding openings in the plenum side walls 234. The ducts 236 extend transversely across each of the potato storage bays 111 from the plenum side wall 234 to at least proximate the exterior side wall 126. Each of the ducts 236 can include a plurality of apertures or openings for distributing the air received from the respective plenum 232 under the potatoes (not shown) piled thereon. The ducts 236 can also be used to distribute and apply substances, such as sprout inhibiting substances, etc., onto the potatoes using various methods and systems known in the art.

Referring again to FIG. 3, after the cooling air (identified by the arrows 344) has flowed upwardly through the potato pile, it is drawn into a series of air movers 354*a-l* positioned in corresponding openings 355*a-l* in a soffit or ceiling panel 350 that extends above the mezzanine deck 240*a*. In the illustrated embodiment, the air movers 354 are relatively evenly spaced and distributed along the length of the mezzanine ceiling panel 350, and are individually positioned in bays between ceiling beams 360*a-k*. The ceiling beams 360 extend outwardly from the central partition wall 230 toward the side wall 126 and support, among other things, an exterior roof panel 356 and an interior roof panel 358. As described in greater detail below with reference to, e.g., FIGS. 4 and 5, the ceiling beams 360 divide the space between the interior roof panel 358 and the ceiling panel 350 into a series of enclosed spaces or ceiling plenums 362 that extend outwardly across the ceiling region of the storage bay 111*a*. Each of the individual ceiling plenums 362 receives air from the individual air mover 354 positioned in that particular ceiling bay.

The mezzanine deck 240 can additionally include a series of recirculation air openings or vents 206*a-h* (FIG. 2) adjacent to the front wall 112. When the recirculation vents 206 are open or at least partially open, the air movers 242 draw air from the mezzanine down into the fan rooms 103. In the illustrated embodiment, each of the recirculation vents 206 is operably aligned with one of the air inlets 106 and one of the inlet doors 108. In operation, the inlet doors 108 can be manually or automatically rotated or moved by a suitable mechanism known in the art between a first position (i.e., an upper position) in which the door 108 fully closes the corresponding vent 206 and opens the corresponding air inlet 106, a second position (i.e., a lower position) in which the door 108 opens the vent 206 and fully closes the inlet 106, and essentially any desired position in between the first and second positions. Fully opening, for example, the vent 206*c* and thereby closing the corresponding air inlet 106*c* increases the recirculation of air (indicated by arrows 346) through the fan room 103*a*. Conversely, fully closing the vent 206*c* and thereby fully opening the air inlet 106*c* increases the flow of outside air into the fan room 103*a*. Additionally, the position of the inlet door 108*c* can also be adjusted to any point in between these two positions to permit air to flow into the fan room 103*a* via both the inlet 106*c* and the vent 206*c*. The amount of recirculation air drawn into the fan room 103*a* can also be varied, adjusted and/or balanced depending on how many of the air movers 354 on the mezzanine ceiling panel 350 are operational and at what speed, how many of the air movers 242 are operational and at what speed, and/or the extent to which the recirculation vents 106 are opened.

Figure 4:
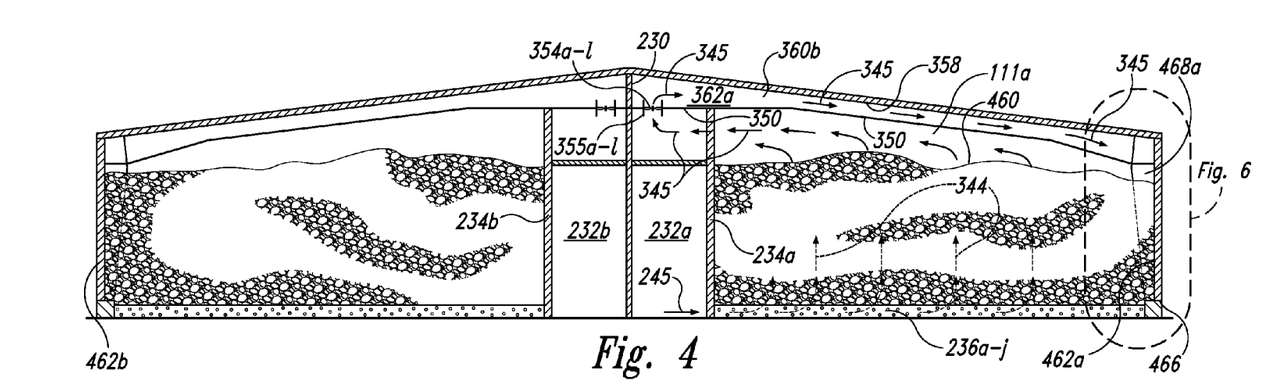
FIG. 4 is a cross-sectional end view of the storage facility of FIGS. 1A-1C taken substantially along line 4-4 in FIG. 1A.
Figure 5:
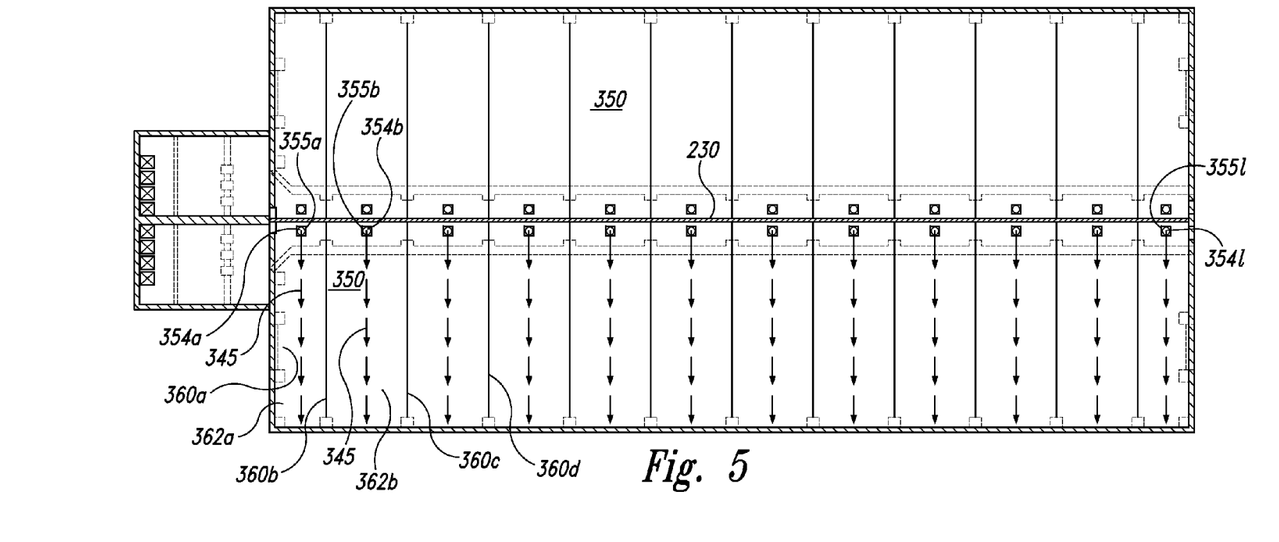
FIG. 5 is a cross-sectional top view of the storage facility of FIGS. 1A-1C taken substantially along line 5-5 in FIG. 1B.

FIG. 4 is a cross-sectional front elevation view taken along line 4-4 in FIG. 1A, and FIG. 5 is a cross-sectional top view taken along line 5-5 in FIG. 1B just above the ceiling panel 350. Referring first to FIG. 4, in the illustrated embodiment the potato storage bay 111*a* extends laterally from the plenum side wall 234*a* on one side to the interior side wall 462*a* on the other side. Conditioned air (e.g., cool and humid air) flowing in the air plenum 232*a* flows into the ducts 236*a-j* (as indicated by arrow 245). As the air (indicated now by arrows 344) flows upwardly through a potato pile 460, the air absorbs heat generated by the potatoes and provides moisture. As a result, the potatoes are kept cool and sufficiently hydrated. The air collecting above the potato pile 460, however, may have warmed and may still have relatively high moisture content. This air (indicated by arrows 345) is drawn away from potato pile 460 by the air movers 354*a-l* and introduced into the ceiling plenums 362*a-l* via the openings 355*a-l* (see also FIG. 3). As shown in FIGS. 4 and 5, once in the plenums 362, the air flows outwardly away from the central partition wall 230 toward the side wall 126*a*. As described in greater detail below with reference to, e.g., FIGS. 6-8, once the air reaches the side wall 126*a*, a portion of the air flows downwardly along an interior side wall 462a before being exhausted from a lower edge portion 466 of the side wall 462a.

One advantage of the embodiment of the potato storage facility described above is that the relatively warm moist air collecting above the potato pile 460 is drawn into the ceiling plenums 362. As a result, this air warms the ceiling panel 350 above the dew point of the air remaining in the storage bay 111a above the potato pile 460. Keeping the temperature of the ceiling panel 350 above the dew point reduces or eliminates the formation of moisture on the underside of the ceiling panel 350, which could otherwise collect and drip down onto the potato pile 460 resulting in rot. Moreover, using warm air from the potatoes to warm the lower ceiling panels 350 can avoid the fuel and/or electricity cost associated with using an industrial air heater for this purpose.

A further advantage of this embodiment is that the inner roof panel 358 may be at a temperature below the dew point of the air in the ceiling plenums 362 because of the proximity of the roof panel 358 to the outside air. If this is the case, then any water condensation from the air in the ceiling plenums 362 will collect on the upper surface of the ceiling panel 350 and not drip down onto the potato pile 460. Moreover, in some embodiments such as the illustrated embodiment, the ceiling panel 350 can slope downwardly as it extends outwardly toward the interior side wall 462a, causing this water to flow outwardly on the upper surface of the ceiling panel 350 toward the interior side wall 462a, where it can be redirected away from the potatoes with a suitable structure (e.g., a gutter; not shown in FIG. 4). Redirecting this water away from the potatoes can reduce product losses due to rot.

Figure 6:
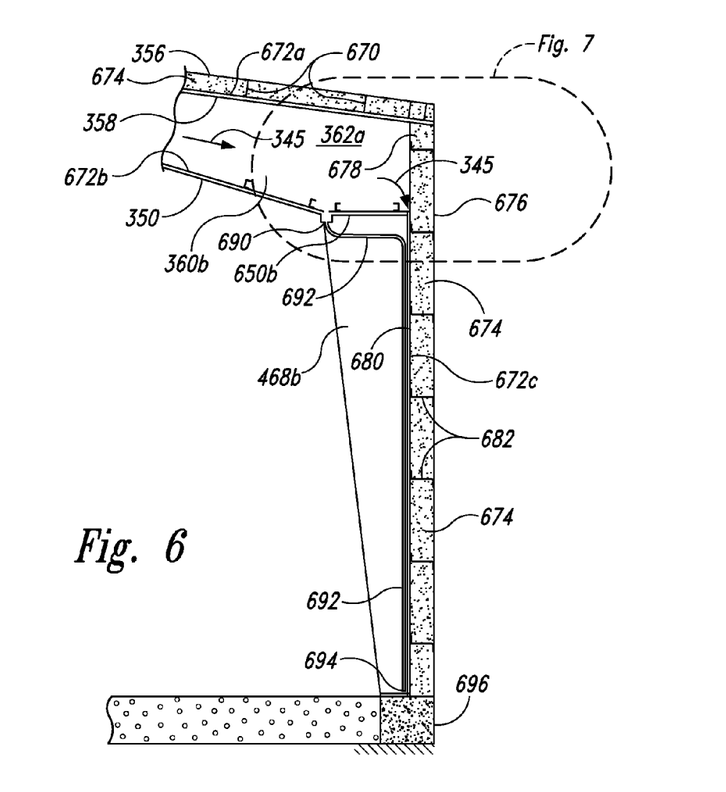
FIG. 6 is an enlarged, cross-sectional view of a side wall and roof portion of the storage facility of FIGS. 1A-1C, taken from FIG. 4.

FIG. 6 is an enlarged, cross-sectional view of a side wall and roof portion of the storage facility 100 taken from FIG. 4. An outer end portion of the roof beam 360b is supported by a corresponding support column 468b. A plurality of roof purlins 670 extend transversely across an upper surface of the roof beam 360b and the adjacent roof beams 360, thereby providing support the exterior roof panel 356. The inner roof panel 358 is attached to the underside of the purlins 670 adjacent to the upper surface of the roof beams 360. In the illustrated embodiment, the inner and exterior roof panels 358 and 356 can be sheet metal panels, such as commercially available corrugated steel panels of various gages. For example, in various embodiments the roof panel 356 can be a PBR 26-gage steel panel, the inner roof panel 358 can be an HR-36 29-gage steel panel, and the ceiling panel 350 can also be an HR-36 29-gage steel panel. In other embodiments, the storage facility 100 can use other materials for the various ceiling and roof panels described herein.

A non-permeable or at least substantially non-permeable seal layer 672a can be applied to an upper side surface of the inner roof panel 358 to prevent or at least inhibit water leakage through joints and fastener holes therein. A seal layer 672b of the same or similar material can also be applied to an upper side surface of the ceiling panel 350 to prevent or at least reduce similar leaks. The seal layers 672 can be made from various types of suitable liners, membranes and fabrics known in the art, including a commercially available Uvmax®-coated fabric known as Simple Saver Fabric and provided by Thermal Design, Inc. of Stoughton, Wis. 53589. Simple Saver Fabric is a proprietary woven, high-density polyethylene fabric. In other embodiments, other suitable permeable and semi-permeable membranes can be used as the ceiling layers 672. Additionally, a suitable insulation material 674, such as a suitable fiberglass insulation having an R value of R38, can be used to fill, or at least approximately fill the cavities between the inner roof panel 358 and the exterior roof panel 356 to thermally insulate the storage facility 100.

A plurality of wall purlins 682 extend transversely across the outer surface of the support column 468b and the adjacent columns 468. An exterior side wall panel 676 is attached to the outer side of the purlins 682, and an inner side wall panel 680 is similarly attached to the inner side of the purlins 682 between adjacent support columns 468. In the illustrated embodiment, the inner and exterior side wall panels 680 and 676 can be sheet metal panels, such as commercially available corrugated steel panels of various gages. For example, in various embodiments the exterior side wall panel 676 can be a PBR 26-gage steel panel, and the inner side wall panel 680 can be an HR-36 29-gage steel panel. In other embodiments, the storage facility 100 can use other materials for the various wall panels described herein.

As described above with reference to the roof of the storage facility 100, a seal layer 672c can be applied to an outer-facing surface of the inner side wall panel 680. The seal layer 672c can be at least generally similar in structure and function to the seal layers 672a and 672b described above. In addition, the insulation 674 described above can also be installed in the side wall cavities between the inner side wall panel 680 and the exterior side wall panel 676. The combination of the insulation 674 and the seal layers 672 on the roof and the side walls of the storage facility 100 can thermally insulate the storage facility 100 to prevent or at least reduce thermal energy losses.

Figure 7:
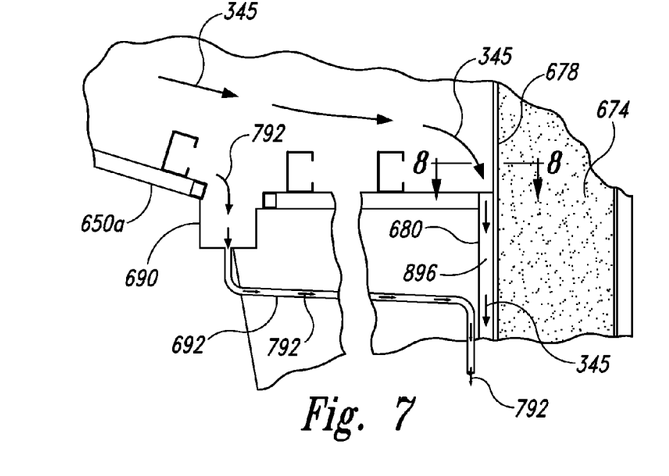
FIG. 7 is an enlarged, cross-sectional view of a portion of the ceiling-to-side wall region of FIG. 6.
Figure 8:
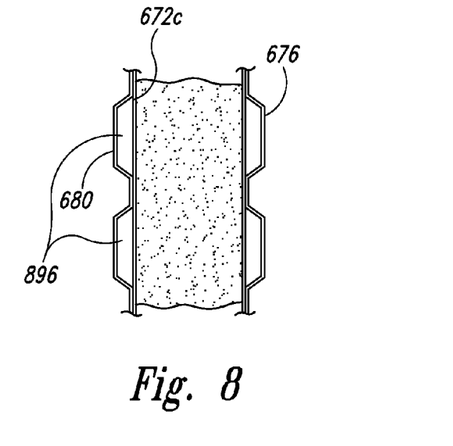
FIG. 8 is an enlarged, cross-sectional end view taken substantially along line 8-8 in FIG. 7, illustrating a storage facility side wall portion configured in accordance with an embodiment of the present technology.

FIG. 7 is an enlarged, cross-sectional view of a portion of the roof-to-side wall region of FIG. 6. FIG. 8 is an enlarged cross-sectional edge view taken substantially along line 8-8 in FIG. 7. Referring to FIGS. 7 and 8 together, as the air (indicated by the arrows 345) flows outwardly in the roof plenum 362a and approaches the side wall 126a, a portion of the air flows downwardly into open channels 896 formed in the inner side wall panel 680. In the illustrated embodiment, the open channels 896 are formed by the corrugations of the inner side wall panel 680. This aft flows downwardly along the length of the inner side wall panel 680 and exits along a lower edge portion 694 of the inner side wall panel 680 proximate to a foundation 696 (FIG. 6) of the storage facility 100. This warm air can advantageously warm the inner side wall panel 680, thereby preventing or at least reducing the formation of condensation on the side wall panel 680 which, in many cases, will be in direct contact with the stored potatoes. This reduction in water can further reduce the onset of potato rot along with the attendant lower storage yields.

Returning to FIG. 7, in a further aspect of this embodiment, a gutter 690 or other similar or suitable water duct or collector can extend horizontally (or at least generally horizontally) along an underside of the roof beams 360 just inboard of the support columns 468. The gutter 690 collects water (indicated by the arrows 792) that flows off of the upper side of the ceiling panel 350 from condensation in the ceiling plenums 362. This water can then be directed away from the gutter 690 by, e.g., suitable drainpipes 692 located at a series of locations along the side wall of the storage facility 100. For example, in one embodiment, an individual drainpipe 692 can be attached to the gutter 690 at each of the support columns 468 and configured to direct the water collected in the gutter 690 downward along the side wall toward the facility foundation 696 (FIG. 6). This water can then be drained away from the facility 100, or recycled for increasing the humidity of cooling air used in the facility.

Figure 9:
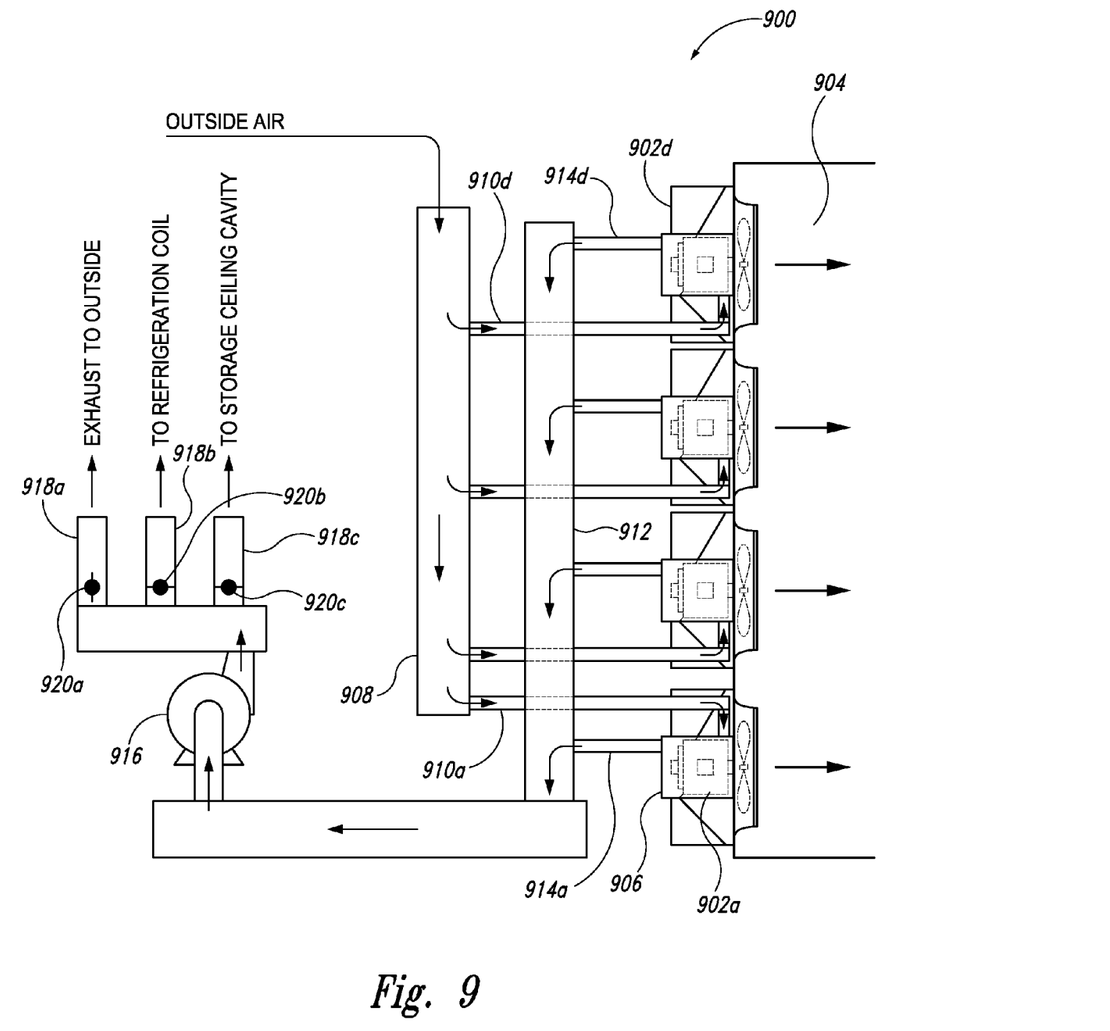
FIG. 9 is a schematic diagram of a facility fan cooling system configured in accordance with an embodiment of the present technology.

FIG. 9 is a schematic diagram illustrating a facility fan cooling system 900 configured in accordance with an embodiment of the present technology. In the illustrated embodiment, the fan cooling system 900 can be used to cool a plurality of fan motors 902a-d (e.g., electric fan motors). The fan motors 902 can be used to drive, for example, the air movers 242 described above with reference to FIGS. 2 and 3. The cooling system 900 includes an inlet manifold 908 having a series of inlet tracks or ducts 910a-d. Each of the inlet ducts 910 is coupled in fluid communication with a corresponding cooling shroud 906a-d. Each shroud 906 extends around and essentially encloses a corresponding fan motor 902a-d, and each of the fan motors 902 drives a corresponding one of the air movers 242. Each of the shrouds 906 is also in fluid communication with a corresponding outlet duct 914a-d, and each of the outlet ducts 914 is in fluid communication with an outlet manifold 912.

An air mover 916 (e.g., a blower, fan, etc.) is positioned in fluid communication with the outlet manifold 912 and configured to move air from the outlet manifold 912 into a series of distribution ducts 918a-c. Each of the ducts 918 can be connected in fluid communication to a particular location or system to make use of the warm air coming from the fan motor cooling shrouds 906. For example, the first duct 918a can be configured to exhaust the warm air outside the storage facility 100. The second duct 918b can be connected in fluid communication to, for example, a refrigeration coil (e.g., a refrigeration coil associated with the air cooler 238 of FIG. 2) to prevent ice buildup on the coil. The third duct 918c can be connected in fluid communication to, for example, one or more ceiling cavities in the storage facility 100 to warm the ceiling panels or otherwise advantageously utilize the warm air to reduce water formation on the stored crop (e.g., potatoes). Moreover, each of the distribution ducts 918 can include a corresponding damper or valve 920 that can be automatically or manually adjusted to control the flow of warm exhaust air to the particular location.

When the fan motors 902 are operating, the air mover 916 circulates cooling air (e.g., outside air) through each of the motor shrouds 906. The outside air absorbs heat from the motors 902 and then flows into the outlet manifold 912 via the corresponding outlet ducts 914. As discussed above, the warmed air can then be put to one or more advantageous uses via the distribution ducts 918.

Without the cooling system 900, heat generated by the fan motors 902 would be absorbed by the air moving through the air movers 242, thereby warming the air. If an cooler (e.g., the air cooler 238 of FIGS. 2 and 3) is positioned upstream of the air movers 242, the air cooler 238 has to expend additional energy to account for this additional heat. One advantage of the cooling system 900, however, is that the fan motors 902 have an independent cooling system. As a result, the fan motors 902 do not add a significant amount of heat to the air flowing through the air movers 242, and the air cooler 238 is able to operate at a lower energy level than would otherwise be required.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

The described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A potato storage facility having a potato storage area, the potato storage facility comprising:
   at least one air inlet configured to receive air from outside the storage facility;
   an air plenum extending adjacent the potato storage area;
   at least one first air mover configured to move the air from the air inlet through the air plenum, wherein the air plenum has a first cross-sectional area toward a first end of the plenum that receives air from the at least one first air mover, and a second cross-sectional area, less than the first cross-sectional area, toward a second end of the plenum that is downstream from the first end of the plenum;
   a plurality of ventilation ducts extending across a floor portion of the potato storage area, wherein each of the ventilation ducts is configured to receive a portion of the air flowing through the air plenum, and wherein each of the ventilation ducts includes a plurality of apertures for flowing the air portions upwardly through a pile of potatoes placed thereon;
   a ceiling panel disposed above the potato storage area; and
   at least one second air mover configured to circulate at least a portion of the air flowing upwardly through the pile of potatoes through an air passage above the ceiling panel.

2. The potato storage facility of claim 1 wherein the air plenum is tapered.

3. The potato storage facility of claim 1, further comprising a heat exchanger disposed between the at least one air inlet and the at least one first air mover.

4. The potato storage facility of claim 1 wherein the potato storage area has a width extending from a first sidewall to a second sidewall, and wherein the at least one second air mover is configured to move the air received from the crop storage area across the full width of the crop storage area in the air passage.

5. The potato storage facility of claim 1 wherein the ceiling panel includes a lower surface facing toward the potato storage area and an upper surface facing toward the roof panel, and wherein the storage facility further comprises a gutter configured to receive water from condensation flowing off the upper surface of the ceiling panel.

6. The potato storage facility of claim 1, further comprising:
   an exterior sidewall;
   an interior sidewall, wherein the potato storage area extends from the interior sidewall to the exterior sidewall, and wherein the at least one second air mover is positioned toward the interior sidewall and configured to move the air received from the potato storage area through the air passage toward the exterior sidewall; and
   an interior gutter extending along an edge portion of the ceiling panel adjacent to the exterior sidewall, wherein the gutter is configured to receive water from condensation of the air flowing through the air passage.

7. The potato storage facility of claim 1 wherein the at least one second air mover is configured to receive the air flowing upwardly through the pile of potatoes and move the air through the air passage.

8. The potato storage facility of claim 1 wherein the roof panel has a first temperature and the ceiling panel has a second temperature, higher than the first temperature.

9. The potato storage facility of claim 1, further comprising an exterior sidewall having an interior panel adjacent to the crop storage area, wherein the interior panel includes a plurality of air channels configured to receive at least a portion of the air flowing through the air passage.

10. The potato storage facility of claim 1, further comprising an interior panel defining a lateral boundary of the potato storage area, wherein the interior panel includes a plurality of air channels having upper end portions spaced apart from lower end portions, wherein the upper end portions are configured to receive at least a portion of the air flowing through the air passage, and wherein the lower end portions are configured to exhaust the air toward the floor portion of the potato storage area.

11. A potato storage facility having a potato storage area, the storage facility comprising:
   at least one air inlet formed in an exterior wall of the storage facility;
   an air cooler;
   at least a first air mover configured to move air from the inlet and past the air cooler;
   an air plenum configured to receive the air from the air mover;
   a plurality of ventilation ducts extending across a floor portion of the potato storage area, wherein each of the ventilation ducts includes an open end portion configured to receive a portion of the air flowing through the air plenum, and wherein each of the ventilation ducts includes a plurality of apertures for flowing the air portions received from the air plenum upwardly through a pile of potatoes placed thereon;
   a ceiling panel disposed above the potato storage area;
   an exterior roof panel disposed above the ceiling panel to define an air passage therebetween; and
   at least a second air mover configured to circulate at least a portion of the air flowing upwardly through the pile of potatoes through the air passage to warm the ceiling panel.

12. The potato storage facility of claim 11 wherein the potato storage area has a width extending from a first sidewall to a second sidewall, and wherein the at least one second air mover is configured to move the air received from the crop storage area across the full width of the crop storage area in the air passage.

13. The potato storage facility of claim 11 wherein the ceiling panel includes a lower surface facing toward the potato storage area and an upper surface facing toward the roof panel, and wherein the storage facility further comprises a gutter configured to receive water from condensation flowing off the upper surface of the ceiling panel.

14. The potato storage facility of claim 11, further comprising:
   an exterior sidewall;
   an interior sidewall, wherein the potato storage area extends from the interior sidewall to the exterior sidewall, and wherein the at least one second air mover is positioned toward the interior sidewall and configured to move the air received from the potato storage area through the air passage toward the exterior sidewall; and
   an interior gutter extending along an edge portion of the ceiling panel adjacent to the exterior sidewall, wherein the gutter is configured to receive water from condensation of the air flowing through the air passage.

15. The potato storage facility of claim 11 wherein the at least one second air mover is configured to receive the air flowing upwardly through the pile of potatoes and move the air through the air passage.

16. The potato storage facility of claim 11 wherein the roof panel has a first temperature and the ceiling panel has a second temperature, higher than the first temperature.

17. The potato storage facility of claim 11, further comprising an exterior sidewall having an interior panel adjacent to the crop storage area, wherein the interior panel includes a plurality of air channels configured to receive at least a portion of the air flowing through the air passage.

18. The potato storage facility of claim 11, further comprising an interior panel defining a lateral boundary of the potato storage area, wherein the interior panel includes a plurality of air channels having upper end portions spaced apart from lower end portions, wherein the upper end portions are configured to receive at least a portion of the air flowing through the air passage, and wherein the lower end portions are configured to exhaust the air toward the floor portion of the potato storage area.

19. The potato storage facility of claim 11 wherein the air plenum is defined by first and second sidewalls and a ceiling, and wherein the ceiling slopes downward in a direction of air flow from the first air mover.

20. A method of environmentally controlling a potato storage facility, the method comprising:
receiving air from outside the storage facility;
flowing the air upwardly through a pile of potatoes stored in the storage facility;
receiving the air after the air has flowed upwardly through the pile of potatoes;
moving at least a portion of the air received from the pile of potatoes through a plenum positioned adjacent a ceiling panel extending over the pile of potatoes;
collecting water from condensation in the plenum; and
directing the water away from the pile of potatoes.

21. The method of claim 20, further comprising cooling the air received from outside the storage facility before flowing it upwardly through the pile of potatoes.

22. The method of claim 21 wherein cooling the air received from outside the storage facility comprises moving the air received outside the storage facility past an air cooler inside the storage facility.

23. The method of claim 20, further comprising increasing the moisture content of the air received from outside the storage facility before flowing it upwardly through the pile of potatoes.

24. The method of claim 20 wherein moving at least the portion of the air received from the pile of potatoes comprises moving the air through a plenum having a first cross-sectional area toward a first end of the plenum and a second, smaller cross-sectional area toward a second end of the plenum that is downstream from the first end of the plenum.

25. The method of claim 20 wherein the potato storage facility includes an interior side wall having a first surface adjacent the pile of potatoes and a second surface opposite the first surface, the method further comprising:
warming the second surface of the interior side wall with a portion of the air received from the pile of potatoes through the plenum.

26. The method of claim 20, further comprising increasing a level of humidity in the air received from outside the storage facility using at least a portion of the water directed away from the pile of potatoes.

* * * * *